United States Patent [19]

Ishii et al.

[11] Patent Number: 4,796,205

[45] Date of Patent: Jan. 3, 1989

[54] FIRE ALARM SYSTEM

[75] Inventors: Hiromitsu Ishii, Chiba; Yukio Yamauchi, Atsugi, both of Japan

[73] Assignee: Hochiki Corp., Tokyo, Japan

[21] Appl. No.: 764,991

[22] Filed: Aug. 12, 1985

[30] Foreign Application Priority Data

Aug. 17, 1984 [JP] Japan ................................ 59-171337

[51] Int. Cl.[4] ...................... G08B 17/00; G06F 11/30

[52] U.S. Cl. .................................... 364/550; 364/185; 340/518; 340/521; 340/577; 340/589; 340/628

[58] Field of Search ............... 364/571, 185, 550, 551, 364/554; 340/505, 506, 518, 500, 521, 522, 577, 578, 589, 627-630, 825.02, 825.06, 825.1, 825.11, 825.05, 870.16, 870.21

[56] References Cited

U.S. PATENT DOCUMENTS

| | | | |
|---|---|---|---|
| 3,924,252 | 12/1975 | Duston | 340/630 |
| 4,254,414 | 3/1981 | Street et al. | 340/627 |
| 4,423,326 | 12/1983 | Ball | 340/578 |
| 4,496,817 | 1/1985 | Smith | 340/578 |
| 4,581,604 | 4/1986 | Kimura et al. | 340/518 |
| 4,592,000 | 5/1986 | Ishizaka et al. | 364/571 |

FOREIGN PATENT DOCUMENTS

| | | | |
|---|---|---|---|
| 0161908 | 10/1982 | Japan | 364/185 |
| 0149571 | 9/1983 | Japan | 364/185 |

*Primary Examiner*—Gary Chin
*Assistant Examiner*—D. C. Goldman
*Attorney, Agent, or Firm*—Lackenbach Siegel Marzullo & Aronson

[57] ABSTRACT

A fire alarm system which makes fire determination based on a novel idea which considers various changes of the physical phenomena in the surroundings caused in relation with the occurrence of a fire in terms of changes of vectors. These changes in the physical phenomena are detected by the detecting section in the form of analog data and processed by a data sampling section as sampled data and stored in a storing section in such a manner as discriminating them by the detecting sections. The tendencies of the changes are computed in a first computing section and the vectors representing the present or future conditions of the physical phenomena are computed from the sampled data. The vector is compared in a comparing section with a preliminarily set data related to the fire detection and when the relation therebetween is not a predetermined one, an alarm is given through an alarming section.

20 Claims, 7 Drawing Sheets

| SENSOR \ OUTPUT | m+1 | m | m-1 | --------- | 1 |
|---|---|---|---|---|---|
| 1a | $X_1^{m+1}$ | $LD_1^m$ | $LD_1^{m-1}$ | --------- | $LD_1^1$ |
| 1b | $X_2^{m+1}$ | $LD_2^m$ | $LD_2^{m-1}$ | --------- | $LD_2^1$ |
| 1c | $X_3^{m+1}$ | $LD_3^m$ | $LD_3^{m-1}$ | --------- | $LD_3^1$ |
| ⋮ | ⋮ | ⋮ | ⋮ | ⋮ | ⋮ |

FIRE ALARM SYSTEM

BACKGROUND OF THE INVENTION a. Field of the Invention

This invention relates to a fire alarm system, and more particularly to a fire alarm system which is adapted to discriminate the conditions of a fire based on analog signals obtained upon detection of changes in the physical phenomena of the surroundings which are caused in relation with the occurrence of the fire.

b. Relevant Arts

As a known system which detects various physical changes peculiar to a fire for discriminating the conditions caused by the fire, there can be mentioned, for example, a system which is adapted to detect a smoke density and a gas concentration increased due to the fire, detect the characteristic relationship between the smoke density and the gas concentration and determine the fire based on the relationship. This relevant art is known from U.S. Pat. No. 4,316,184 issued on Feb. 16, 1982 and also known from U.S. Pat. No. 4,319,229 issued on Mar. 9, 1982.

The discrimination of the conventional system, however, depends only upon the slope obtained from the relationship between the two physical changes peculiar to a fire. Therefore, it is difficult to synthetically and surely judge real danger of the fire, and in case the fire conditions do not follow the preset characteristic curve, the determination of the fire will be inaccurate, causing a delay in the fire detection or a false alarming.

SUMMARY OF THE INVENTION

The present invention has been made to obviate the problems as described above and it is an object of the present invention to provide a fire alarm system which is capable of making a fire determination accurately and quickly irrespective of the conditions of the fire and capable especially of minimizing false alarming which is generated when no fire occurs.

To achieve this object, the fire alarm system of the present invention comprises n (two or more) detecting sections for detecting changes in the physical phenomena of the surroundings caused in relation with the occurrence of the fire and outputting analog data corresponding to the changes, respectively; a data sampling section for sampling the data at predetermined sampling periods; a storing section for storing the sampled data output from the data sampling section in such a manner as to discriminate between the data from each of the n detecting sections; a first computing section for extracting the n kinds of data from the storing section to compute the tendencies of changes in the data; a second computing section for computing vectors which represent the present or future conditions of the physical phenomena from the tendencies of the changes computed by the first computing section and the n kinds of data stored in the storing section and supplied therefrom by a data extracting section; and a comparing section for comparing the vectors computed by second computing section and the data which has been preliminarily set with respect to fire detection to generate an output to an alarming section when the former exceeds a predetermined range which is defined in connection with the latter for generating an alarm.

With this arrangement, the present invention can synthetically determine the tendencies of the physical changes peculiar to a fire so as to properly identify the conditions of the fire, improving the reliability of the alarming signal and minimizing generation of a false alarming signal when there is no fire.

Further according to the present invention, a closed surface in a n dimensional space corresponding to the danger level may be employed as a reference for the fire determination. The configuration of the closed surface in the n dimensional space a be set according to the kind of the fire (a flaming fire, a smoldering fire, etc.) or the scale of the fire to determine the actual fire conditions. As a result, appropriate actions such as controlling of fire preventing equipments, driving of fire equipments, leading to escape, etc. can be taken according to the determined fire conditions.

DESCRIPTION OF THE PREFERRED EMBODIMENTS

Prior to describing the preferred embodiments of the present invention, the principal features of the invention will first be explained referring to FIGS. 1 and 2.

Figure 1:
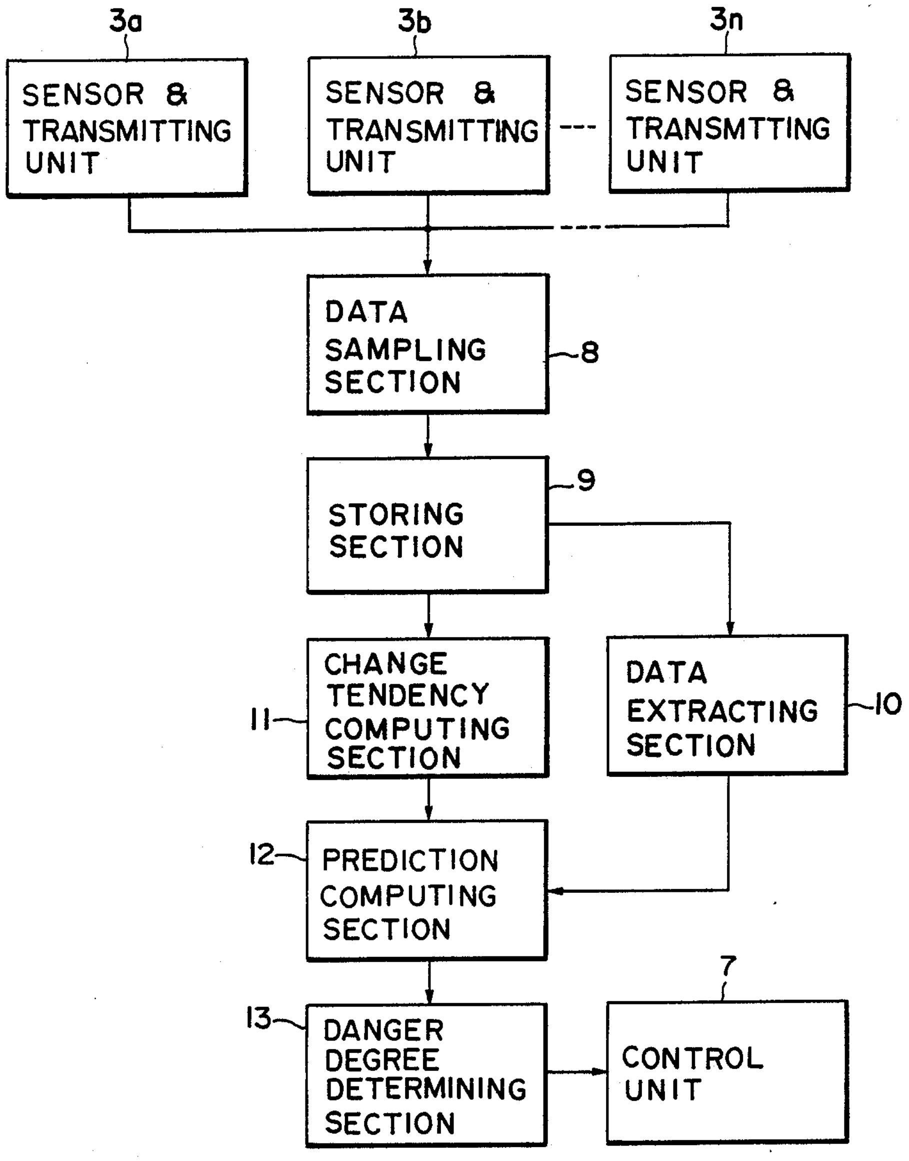
FIG. 1 is a block diagram of the principal features of the system of the present invention.
Figures 2, 4:
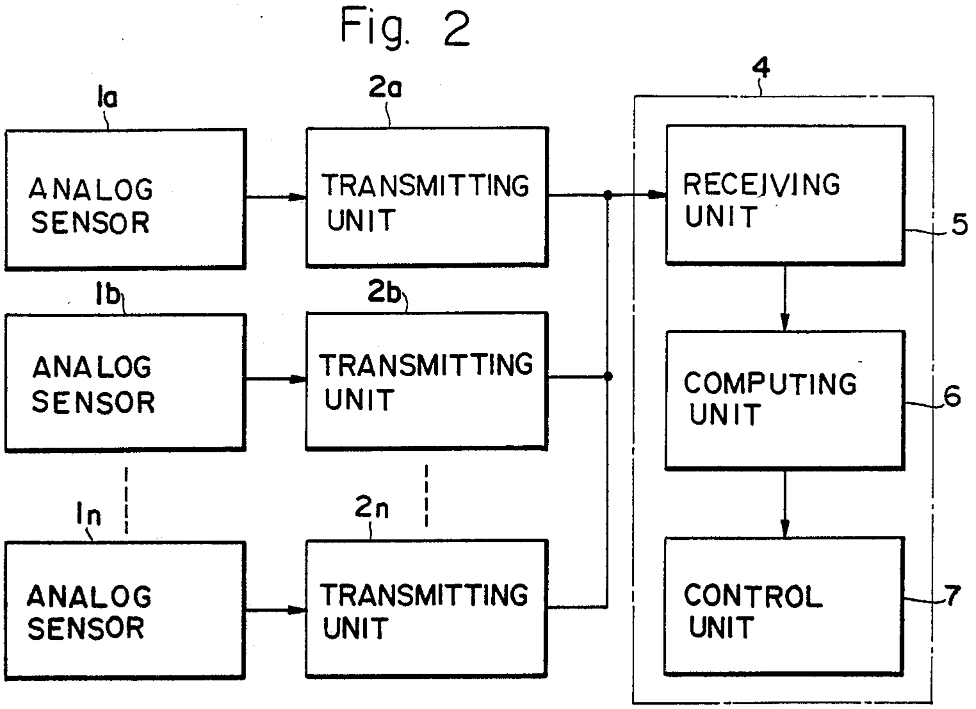
FIG. 2 is a block diagram of a some specific form of the system as illustrated in FIG. 1.
FIG. 4 is a table showing the storing stages of the sampled data in the storing section shown in FIG. 3.

In FIG. 2, 1*a*, 1*b*, . . . 1*n* are analog sensors. The analog sensors 1*a*, 1*b*, . . . 1*n* detect n (two or more) kinds of different physical changes and output analog signals corresponding to the detected amounts, respectively to transmitting units. 2*a*, 2*b*, . . . 2*n*, respectively. Together, as shown in FIG. 1, they constitute n sets of detecting sections 3*a* to 3*n*. The transmitting units 2*a* to 2*n* convert the analog detection signals from the analog sensors 1*a* to 1*n* into digital signals, respectively, and transmit the same in the digital form to a central signal station 4. The analog sensors 1*a* to 1*n* are installed at the same alert area and mounted adjacently to each other so as to make a fire detection under the same conditions.

The receiving and controlling section of the central signal station 4 comprises a receiving unit 5, a computing unit 6 and a controlling unit 7. The receiving unit 5 includes, as seen in FIG. 1, a data sampling section 8 to which the output lines from the transmitting units 2*a* to 2*n* of the detecting sections 3*a* to 3*n* are connected. 4 digital transmission between the transmitting units 2*a* to 2*n* and the receiving unit 5, there may be employed any suitable system such as a polling system in which the transmitting units 2*a* to 2*n* are sequentially called by the receiving unit 5 for transmitting the digital data therefrom, respectively; or a system in which the transmitting units 2*a* to 2*n* sequentially transmit the digital data with address codes; or a system in which the transmitting units 2*a* to 2*n* are connected to the receiving unit 5 through special signal lines.

The computing unit 6, FIG. 2, makes a specific computation based on data sequentially received by the receiving unit 5 from the respective sensors. As the computing unit 6, there may be used a microcomputer. The computing unit 6 comprises, as seen in FIG. 1, a storing section 9, a data extracting section 10, a change tendency computing section 11, a prediction computing section 12, and a danger degree determining section 13. The storing section 9 stores the data output from the data sampling section 8 in the receiving unit 5, discriminating the data from the respective n analog sensors. The data extracting section 10 read the data stored in the storing section 9 to supply the same to the change tendency computing section 11. The change tendency computing section 11 computes the tendencies of the n data to change in the future. The prediction computing section 12 computes vectors in the n dimensional spaces representing the present or future states of the n physical changes. For this computation, the change tendencies of the data computed by the change tendency computing section 11 and the data stored in the storing section 9 are used. The danger degree determining section 13 makes a fire determination or danger determination based on the results computed by the prediction computing section 12 and generates an output signal when it determines that the environmental conditions are in a specific range.

The output signal from the computing unit 6 is supplied to the controlling unit 7 and the controlling unit 7 controls the fire alarming and the driving of the fire equipments.

The principle of the fire determination according to the present invention will now be described.

If the n kinds of present physical changes peculiar to a fire to be detected by the analog sensors 1*a* to 1*n* are assumed as x1, x2, . . . xn, and an n dimensional space with the physical changes x1 to xn as an ordinate or abscissa is considered, the synthetic vector X in the n dimensional space can be expressed by:

$$\vec{x} = x1\,\mathring{i}1 + x2\,\mathring{i}2 + \ldots + xn\,\mathring{i}n$$

where $\mathring{i}$ i (i+1, 2, . . . n) represents a unit vector in the respective coordinate directions. If a time element t is included in the synthetic vector x, the synthetic vector x changes in the n dimensional space according to the development of the fire and the vector locus drawn by the terminal point of the synthetic vector x indicates a corresponding change in the surroundings. Thus, the conditions of the surroundings related to the fire at any time can be expressed by the vector x(t) in the n dimensional space.

Now, if the values of the physical changes x1 to xn are assumed as positive and x1 to xn are selected so that the values of the physical changes x1 to xn become larger as the fire spreads; the danger due to the fire becomes larger as the vector x extends further from the coordinate origin of the n dimensional space.

For example, if temperature T, smoke density Cs and CO gas concentration Cg are selected as the physical changes, and if a change (T−T0) of the temperature T from a normal temperature is assumed as a physical change x1, and similarly a change of the smoke density Cs and a change of the CO gas concentration Cg are assumed as physical changes x2 and x3, respectively, the vector x of the physical changes x1 to x3 will move away from the origin according to the development of the fire.

In this case, the physical changes x1 to xn may be suitably selected corresponding to the place to be supervised, the materials expected to be fired, the kinds of alarm, e.g. an alarm for letting people escape or an alarm for starting the extinguishing action, or the like. For example, if oxygen concentration CgO is used relative to of the CO gas concentration Cg, the physical change x3 may be CgO−Cg (where CgO is a normal oxygen concentration).

In the n dimensional space determined by the n physical changes, the danger level, i.e. a level at which the human beings can exist, which is to be detected, can be set as an n dimensional closed surface. The n dimensional closed surface defining the danger level is expressed by the following formula:

$$f(x1, x2, \ldots xn) = 0$$

In this case, when the terminal point of the vector x determined by the physical changes x1 to xn passes through the closed surface of the formula, it can be supposed that the fire has reached the danger level.

If the closed surface $f(x1 \ldots xn) = 0$ is a three-dimensional ellipse surface, the formula can be expressed by:

$$(a1x1^2 + a2x2^2 + a3x3^2) - 1 = 0$$

If the constants a1 to an are included in x1 to xn and standardized as x1 to xn, the closed surface representing the danger level may be considered as a three-dimensional spherical surface with a radius r which can be expressed by:

$$(x1^2 + x2^2 + x3^2) - r^2 = 0$$

In other words, the constants a1 to an may be changed to evaluate the analog data 1a to 1n for effecting the optimum fire detection.

After the n dimensional closed surface for determining the danger level is set, the physical change values x1(t) to Xn(t) detected at time t are substituted for the above x1 to xn. When the condition $$f\{(xi(t))\} > 0$$

is satisfied, the terminal point of the vector x passes through the closed surface as given by the above formula and is out of the closed surface, and therefore it can be determined that the conditions of the fire exceeds the danger level.

In this connection, it is to be noted that although only a two-dimensional ellipse or circle surface, or a three-dimensional ellipse or spherical surface is mentioned as an example of the closed surface f(x) in the embodiments of the present invention throughout the specification, the closed surface f(x) may be any surface insofar as it can be expressed as a function of the physical changes x1 to xn.

A first specific embodiment will now be described referring to FIGS. 3 to 7.

Although the detection outputs xi(t) from the analog sensors 1*a* to 1*n* are used as they are in the foregoing description of the principle, the fire determination of the first embodiment is made based on the prediction of the terminal point of the vector $\times$ after a predetermined time from the present time.

The parts or portions similar to or same as the parts or portions of the system as illustrated in FIGS. 1 and 2 are denoted by similar or same numerals and the explanations thereof are simplified here.

Figure 3:
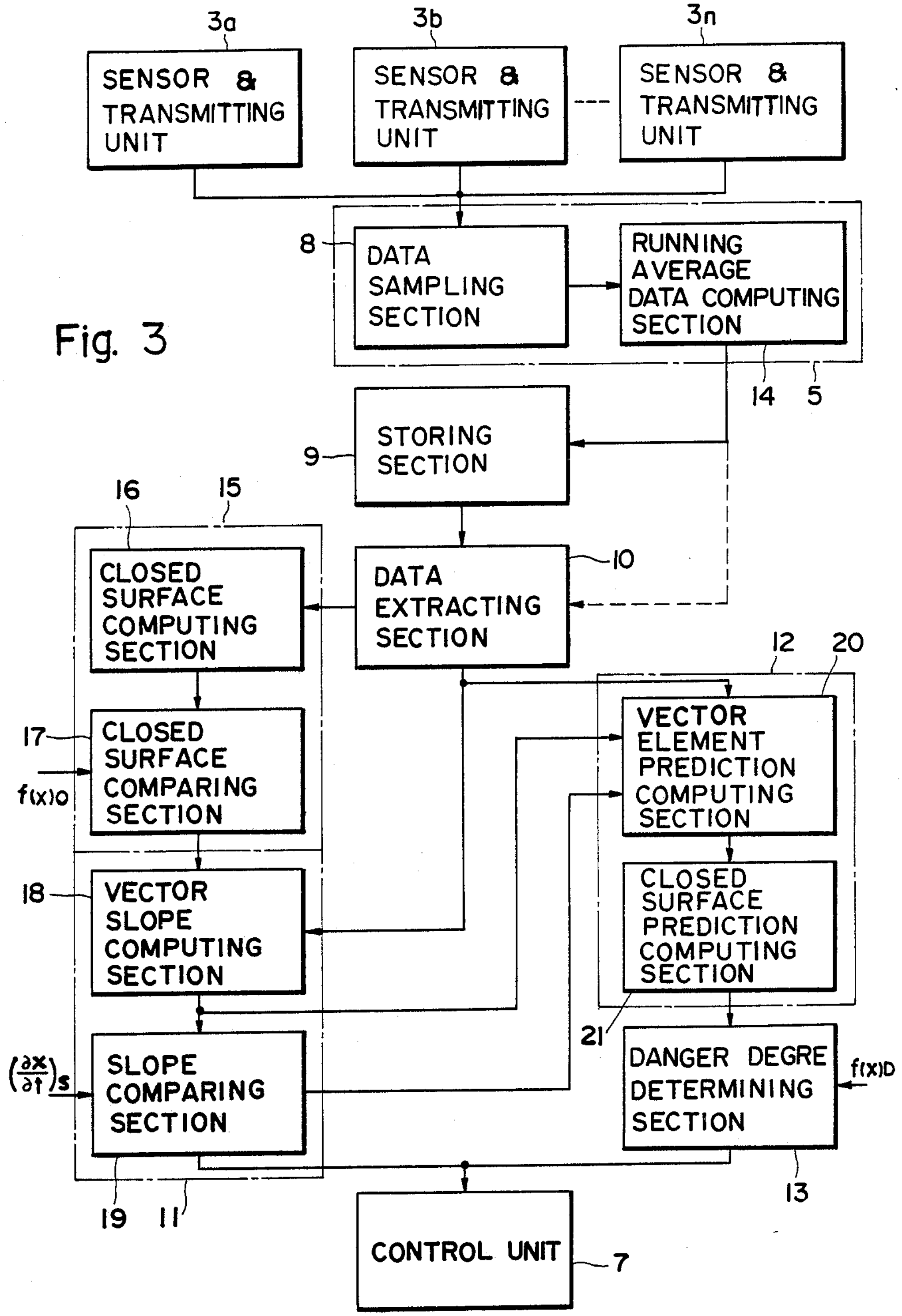
FIG. 3 is a block diagram of a first embodiment of the present invention.

Analog sensors 1*a* to 1*n* and transmitting units 2*a* to 2*n* in FIG. 2 are combined in FIG. 3 as detection sections 3*a*, 3*b* . . . 3*n*. The detection sections 3*a* to 3*n* detect changes in physical phenomena such as a temperature T, a smoke density Cs, CO gas concentration Cg, etc. as physical changes x1, x2, . . . xn.

A receiving unit 5 comprises a data sampling section 8 connected to the output lines of the transmitting units 2*a* to 2*n* and a running average data computing section 14. The running average data computing section 14 sequentially effects a running averaging operation with respect to the output data from the analog sensors 1*a* to 1*n* sampled by the data sampling section 8. More specifically, the output data from the analog sensor 1*a* is sequentially expressed as $x1^1$, $x1^2$, . . . $x1^m$, $x1^{m+1}$ . . . and the latest output data $xa^{m+1}$, the prior data $xa^m$ and the back data $xa^{m-1}$ are subjected to arithmetic mean operation to obtain a running average data $LDa^m$. This running average data is expressed by:

$$LDi^m=(xi^{m+1}+xi^m+xi^{m-1})/3$$

where i=1, 2 . . . n.

The step for obtaining the running average is carried out for each of the analog sensors 1*a* to 1*n* obtain the latest data $x1^{m+1}$, $x2^{m+1}$ . . . $xn^{m+1}$. The superscripts 1, 2 . . . m, m+1 . . . represent not the power but the time sequence.

The running average has a function of filtration. More specifically, the running average can eliminate the influence of noises such as smoke of cigarettes etc. which produce data extraordinary as compared with the other data from the analog sensors by averaging the same and the other two data.

The running average data $LDi^1$, $LDi^2$ . . . $LDi^m$ are sequentially input to the storing section 9 and stored therein. The data is stored in the storing section 9 by the detecting sections 3*a*, 3*b* . . . 3*n* as shown in FIG. 4. The oldest data is erased upon input of the latest data. However, if the capacity of the storing section 9 is large, another disposal manner may be employed.

Alternatively, to obtain the running average data $LDi^m$, the data extracting section 10 and the running average data computing section 14 may be connected as shown by a broken line in FIG. 3 so as to compute it from the latest output data $xi^{m+1}$ from the analog sensors 1*a* to 1*n*, the output data $xi^m$ at the prior time and the latest running average data $LDi^{m-1}$. The noise eliminating means is not limited to the example as described above but other known means may alternatively be employed. The transmitting units 2*a* to 2*n* may be omitted when the analog sensors 1*a* to 1*n* have a data processing function.

The computing unit 6 comprises the storing section 9 as described above, a data extracting section 10, a level determining section 15, a change tendency computing section 11 and a prediction computing section 12 which is at the stage after the data extracting section 10.

The level determining section 15 comprises a closed surface computing section 16 and a closed surface comparing section 17. The level determining section 15 computes a vector $\times$ which represents the present conditions of the surroundings from the latest running average data $LDi^m$ and determines whether the change tendency computing section 11 at the following stage should be actuated or not. The closed surface computing section 16 has an equation of the closed surface $f(x)=0$ representing a predetermined computation initiating level preliminarily set therein. The latest n kinds of running average data $LD1^m$, $LD2^m$ . . . $LDn^m$ are substituted to compute the vector representing the present status. For example, if an equation f(x) for the closed surface is defined as $$f(x)_0=\{(a1(x1)^2+a2(x2)^2+\ldots+an(xn)^2)\}-1$$

the computation is made with respect to the latest running average values $LD1^m$ . . . $LDn^m$ as follows:

$$f(x)_0{}^m=\{(a1(LD1^m)^2+a2(LD2^m)^2\ldots a3(LDn^m)^2)\}-1$$

The closed surface comparing section 17 compares the two values of $f(x)_0{}^m$. When $f(x)_0=0$, the terminal point of the vector formed by the latest running average values $LD1^m$ represents the computation initiating level and an output signal is generated to actuate the change tendency computing section 11. The computation initiating level is determined according to the ambient conditions so that the entire system is not operated whenever the data from the analog sensors 1*a* to 1*n* are sampled and the running average data is computed. The prediction computation is effected only when the running average data exceeds a predetermined level. Thus, the effective operation of the system can be assured.

The change tendency computing section 11 comprises a vector slope computing section 18 and a vector slope comparing section 19. The vector slope computing section 18 computes two synthetic vectors based on the latest running average data $LD1^m$, $LD2^m$ . . . $LDn^m$ from the analog sensors 1*a* to 1*n* from the storing section read by the data extracting section 10, and computes the slope of the vectors.

If unit vectors of the data of the respective analog sensors 1*a* to 1*n* are assumed as $\mathring{i}$ 1, $\mathring{i}$ 2 . . . $\mathring{i}$ n, the vector $\times$ can be expressed by:

$$\times=LD1^m\,\mathring{i}1+LD2^m\,\mathring{i}2\ldots+LDn^m\,\mathring{i}n$$

Therefore, if the synthetic vector $\times$ (t0) at the present time t0 and the synthetic vector $\times$ (t0−Δt) at a time earlier by a predetermined period Δt are obtained, the slope of the vector $(\partial X/\partial t)_{to}$ can be computed.

The slope of the vector can be computed as follows:

$$(\partial\times\partial t)_{t0}=\times(t0)-\times(t0-\Delta t)/t$$

The slope as given above is applicable when the running average data LDi changes linearly, but when the running average data LDi changes abruptly as a quadratic curve, the slope can be computed as follows:

$$(\partial^2\times/\partial t^2)_{t0}=\times(t0)-2\times(t0-\Delta t)+\times(t0-2\Delta t)/\Delta t^2$$

The vector slope comparing section 19 compares a reference slope $(\partial\times/\partial t)_s$ which is predetermined in relation with the above-mentioned vector slope $(\partial\times/\partial t)_{t0}$. And when $$(\partial\times/\partial t)_{t0}\geqq(\partial\times/\partial t)_s$$

an output signal is generated directly to the control unit 7. At any other time, an output signal is generated to the prediction computing section 12.

The prediction computing section 12 comprises a vector element prediction computing section 20 and a closed surface prediction computing section 21. The vector element prediction computing section 20 computes the slopes of the data from the analog sensors 1*a* to 1*n* from the running average values $LD1^m$ to $LDn^m$ of the respective analog sensors 1*a* to 1*n*, and makes predicting computation of further data from the respective analog sensors 1*a* to 1*n* after a predetermined period ta of time from the present time t0.

In order to predict the future position of the n dimensional vector $\chi$ linearly, the slope $(\partial\chi/\partial t)_t$ of the vector $\chi(t)$ at the present time t0 is obtained and the vector $\chi(t)$ is extended along the slope so that the terminal point of the vector $\chi$ after the predetermined period of time ta may be predicted.

More specifically, vector $\chi(t0+ta)$ after ta seconds from the present time t0 can be approximated as follows:

$$\chi(t0+ta)=\chi(t0)+ta(\partial\chi/\partial t)_{t0}$$

The slope $(\partial\chi/\partial t)_t$ can be obtained from the difference between the vector position $\chi(to-\Delta t)$ at a time back by a predetermined period ta of time from the present time t0 and the vector position $\chi(t)$ as follows:

$$(\partial\chi/\partial t)_{t0}=\chi(t0)-\chi(t0-\Delta t)/\Delta t$$

If this formula is expressed by the respective physical changes x1 to xn, the followings are obtained:

$$x1(t0+ta)=x1(t0)+ta(\partial X1/\partial t)_{t0}$$
$$\vdots$$
$$xn(t0+ta)=xn(t0)+ta(\partial Xn/\partial t)_{t0}$$

The slopes of the data from the respective analog sensors 1*a* to 1*n* can be expressed as follows:

$$(\partial x1/\partial t)_{t0}=x1(t0)-x1(t0-\Delta t)/\Delta t$$
$$(\partial x2/\partial t)_{t0}=x2(t0)-x2(t0-\Delta t)/\Delta t$$
$$\vdots$$
$$(\partial xn/\partial t)_{t0}=xn(t0)-xn(t0-\Delta t)/\Delta t$$

If $i=1, 2 \ldots n$, $$xi(t0+ta)=xi+t_a(\partial\chi i/\partial t)to$$
$$(\partial xi/\partial t)_{t0}=xi(t0)-xi(t0-\Delta t)/\Delta t$$

If the running average data $LD1^m, LD2^m \ldots LDn^m$ are computed at present time $t_0$, the physical change of the data of each sensors 1*a* to 1*n* after the predetermined period ta of time can be expressed as follows:

$$x1^{m+M}=LD1^m+M\Delta t(\partial x1/\partial t)_{t0}$$
$$x2^{m+M}=LD2^m+M\Delta t(\partial x2/\partial t)_{t0}$$
$$\vdots$$
$$xn^{m+M}=LDn^m+M\Delta t(\partial xn/\partial t)_{t0}$$

where $ta=M\Delta t$.

The slopes are expressed as follows.

$$(\partial x1/\partial t)_{t0}=LD1^m-LD1^{m-1}/\Delta t$$
$$(\partial x2/\partial t)_{t0}=LD2^m-LD2^{m-1}/\Delta t$$
$$\vdots$$
$$(\partial xn/\partial t)_{t0}=LDn^m-LDn^{m-1}/\Delta t$$

The closed surface prediction computing section 21 predicts the position of the terminal point of the synthetic vector by using the data $x1^{m+M}$, $x2^{m+M} \ldots xn^{m+M}$ after the predetermined period ta of time which have been computed as described above. More specifically, these data are substituted for the predetermined equation of the closed surface $f(x)_D$ to compute the values. if the equation is predetermined as:

$$f(x)_D=\{(a1(x1)^2+a2(x2)^2+\ldots+an(xn)^2)\}-1$$

closed surface $f(x_{m+M})_D$ of which after passing the predetermined time ta from the present time to is computed as follows:

$$f(x_{m+M})_D=\{(a1(x1^{m+M})^2+a2(x2^{m+M})^2+\ldots+an(xn^{m+M})^2)\}-1$$

Since $xi^{m+M}$ in the above formula contains an element of time, the positions of the terminal points of the synthetic vectors $\chi$ obtained by synthesizing the future values of the respective data are shown in relation with the predetermined closed surface $f(x)_D=0$.

The danger degree determining section 13 determines whether the terminal point of the synthetic vector x is within or extends out of the closed surface $f(x)_D=0$ when $$\{a1(x1^{m+M})^2+a2(x2^{m+M})^2+\ldots+an(xn^{m+M})^2\}-1=0$$

and generates an output signal to the controlling section 7.

To approximate the position of the terminal point of the synthetic vector relative to a quadratic reference point, the following quadratic approximation and differential coefficient may be employed.

$$\chi(t0+ta)=\chi(t0)+ta(\partial\chi/\partial t)_{t0}+\{ta^2(\partial\chi/\partial t^2)_{t0}/2\}$$
$$(\partial^2\chi/\partial t^2)_{t0}=\chi(t0)-2\chi(t0-\Delta t)+\chi(t0-2\Delta t0/\Delta t^2$$

The prediction of the vector can be effected in a similar manner with respect to n(third or more)-degree approximation.

Figure 5:
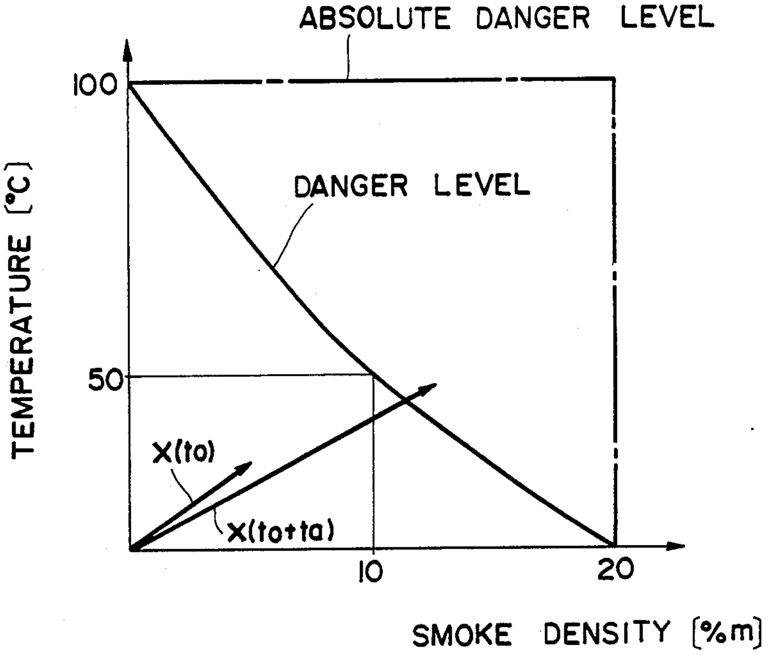
FIG. 5 is an explanatory diagram showing the predictive determination of a fire by using a vector in relation to temperature and smoke density.

FIG. 5 is an explanatory diagram concretely showing the fire determination by the vector predicting computation as described above with respect to two physical changes such as temperature and smoke density. For example, if the absolute danger level of the temperature is set as 100° C. and the absolute danger level of the smoke density is set as 20%/m in terms of extinction, a combination danger level for example in the sector shape shown by a solid line is preliminarily set within an absolute danger level shown by one dot-and-chain line. The combination danger level is always set within the absolute danger level.

In the two-dimensional space of temperature and smoke density, if the vector at the present time t0 is assumed as $x$ (t0), the vector $x$ (t0+ta) after the time period ta from the present itme is predictively computed. If the computed vector $x$ (t0+ta) passes through the combination danger level as shown in FIG. 5, a fire is determined and an alarming signal is generated. If the vector $x$ (t0+ta) does not reach the combination danger level, an alarming signal is not generated and further predictive computation for the vector based on the succeeding sampling data is effected.

Figure 6:
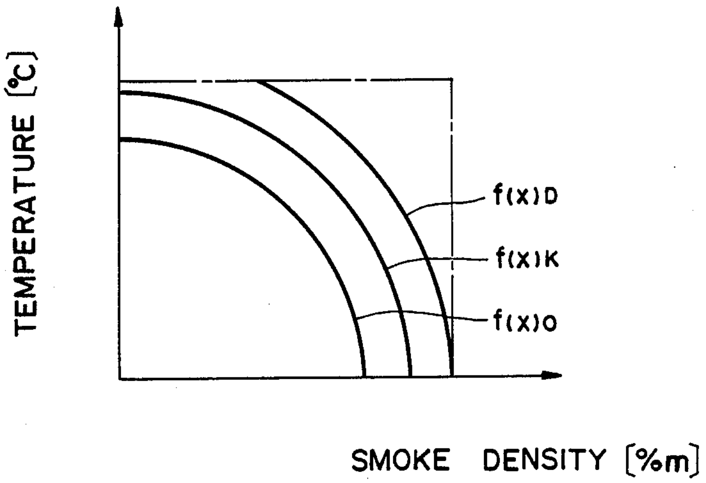
FIG. 6 is an explanatory diagram showing the relation between a computation initiating level, a fire level, and a danger level.

Alternatively, as shown in FIG. 6, a closed surface $f(x)_k=0$ representing a fire level may be additionally provided between a closed surface $f(x)_o=0$ representing the computation initiating level and a closed surface $f(x)_D=0$ representing the danger level. In this case, either of the danger level and the fire level may be selected and the contents of the alarm can be varied.

Figure 7:
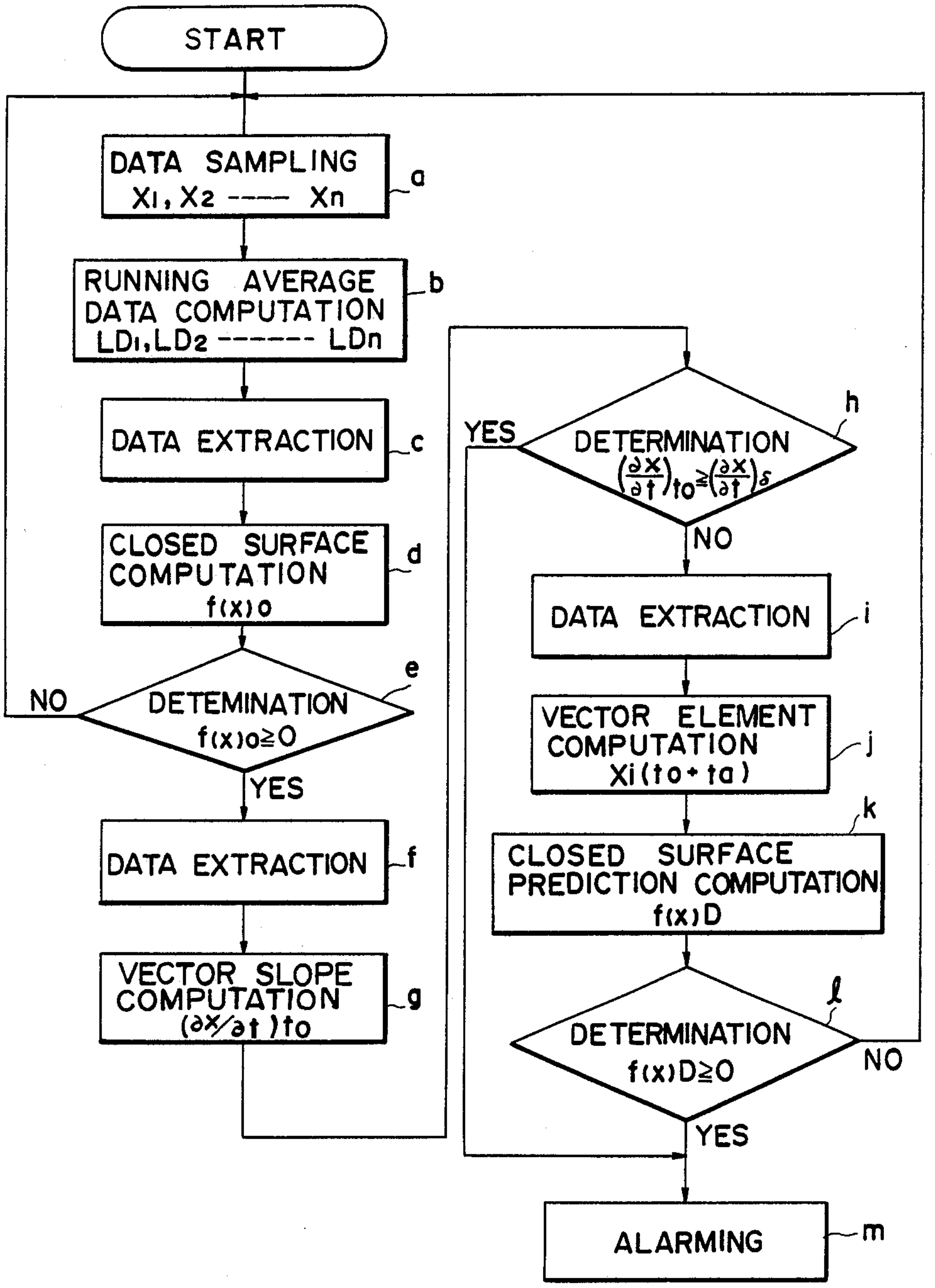
FIG. 7 is a flowchart for a microcomputer employed in the first embodiment of the present invention.

The fire determining process in the first embodiment will now be described referring to the flowchart in FIG. 7 for the microcomputer. In the flowchart, at block a, the digital data transmitted from the transmitting units 2*a* to 2*n* of the respective analog sensors 1*a* to 1*n* are received from the analog sensors to effect data sampling. At block b, noises contained in the digital data received simultaneously with the data sampling due to the sensors themselves or noises due to the changes in the surroundings or caused during the data transmission are eliminated by the running average process to obtain running average data LD1, LD2 . . . LDm of the physical changes peculiar to fire and different from different sensors.

At block c, the latest running average data $LD1^m$ to $LDn^m$ of the respective analog sensors 1*a* to 1*n* are extracted.

At block d, these data are substituted for the closed surface formula $f(x)_o$ which represents the predicting computation initiating level to compute such level. At block e, it is determined whether the closed surface formula $f(LD1^m, LD2^m \ldots LDn^m)_o$ is larger or smaller than 0. If the value is smaller than 0, the succeeding processing will not be effected and the step is returned to block a. If the value is 0 or more, the predicting computation processing after block f will be carried out.

At block f, the running average data $LD1^m$ to $LDn^m$ of the respective analog sensors 1*a* to 1*n* at the present time t0 and the running average data $LD1^{m-1}$ to $LDn^{m-1}$ back by the predetermined time Δt are extracted. At block g, the slope $(\partial x/\partial t)_{t0}$ of the vector is computed based on the running average data.

At block h, the reference data $(\partial x/\partial t)_s$ and the slope $(\partial x/\partial t)_{t0}$ are compared and when $(\partial x/\partial t)to \geqq (\partial x/\partial t)s$, the step proceeds to block m to generate an alarm. In the contrary case, the step proceeds to block i.

At block i, the slope $(\partial x/\partial t)_{t0}$ of the vector is extracted and at block j, the position of the vector $x$ after the predetermined time ta from the present time t0 is computed for the respective physical changes x1 to xn from the extracted slope of the vector and the vector $x$(t0) at the present time t0. After the predicting computation of the vector element xi(t0+ta) after a time ta from the present time t0 has been completed at block j, the vector predicting computation such as whether the predicted vector $x$(t0+tr) passes through the preset closed surface $f(x)_0=0$ in the n-degree space which represents the danger level is carried out at block k.

Subsequently, at block 1, it is determined whether the value of $f(x)_D=0$ given by the predicted vector after the time tr which has been obtained at block k is larger or smaller than 0. When the predicted vector passes through the closed surface $f(x)_D=0$ representing the danger level, the computed value at block k has a positive value exceeding 0 and when the predicted vector does not reach the closed surface representing the danger level, the computed value has a negative value smaller than 0. As a result, when the value is determined as being larger than 0 at block 1, the predicted vector after the time tr is determined as reaching the closed surface representing the danger level and an alarming signal indicating a fire is output at block m. on the other hand, if the computed value is determined as being smaller than 0 at block 1, it is determined that the predicted vector does not reach the closed surface representing the danger level and the step is returned to block a to repeat similar predicting computation processing.

The second embodiment of the present invention will now be described referring to FIGS. 8 and 9. The parts and portions similar to or same as the parts and portions of the first embodiment are denoted by similar or same numerals and the explanations thereof will be simplified.

The second embodiment is so adapted that it may compute how long after which the vector x representing the present status will reach the danger level for determining a fire.

Analog sensors 1*a* to 1*n* and transmitting units 2*a* to 2*n* constitute detecting sections 3*a* to 3*n*, respectively. A data sampling section 8 and a running average data computing section 14 constitute the receiving unit 5. A storing section 9 comprises a sampling data storing section 25 and a running average data storing section 26. The sampling data storing section 25 is located between the data sampling section 8 and the running average data computing section 14.

Between the data sampling section 8 and the running average data computing section 14 is further provided a computation initiating level comparing section 15*a* in parallel with the sampling data storing section 25. In the computation initiating level comparing section 15*a*, n kinds of threshold values L1 to Ln are preliminarily set for the sample data from the respective analog sensors 1*a* to 1*n* of the detecting sections 3*a* to 3*n* and an output signal is generated when any one of the sampled data x1 to xn exceeds the corresponding threshold values L1 to Ln. The running average data computing section 14 is not actuated until this output signal is generated. Therefore, the running average processing operations are reduced to improve the efficiency of the system. The computation result of the running average data computing section 14 is stored in the running average data storing section 26.

At a stage after the running average data storing section 26, a level determining section 15 similar to that of the first embodiment is provided. The level determining section 15 includes a closed surface computing section 16 and a closed surface comparing section 17 and computes a vector $x$ representing the conditions of the surroundings at the present time from the latest running average data $LDi^m$ so as to determine whether a change tendency computing section 27 at the following stage is to be actuated or not. In this embodiment, however, a closed surface $f(x)_k=0$ corresponding to a level representing a fire which is higher than the threshold values L1 to Ln representing the computation initiating level is preliminarily set in the closed surface comparing section 17. Therefore, the level determining section 15 supplies to alarming section 7 a signal representing the occurrence of a fire when $f(x)_k \geqq 0$, i.e. when the terminal point of the vector formed by the latest running average values $LD1^m \ldots LDn^m$ is at the closed surface representing the fire level or passing through the closed surface. At other time, an actuating signal is generated to the change tendency computing section 27.

The change tendency computing section 27 comprises a regression line computing section 28 for obtaining a regression line from the running average data $LDi^1 \ldots LDi^m$ for the respective analog sensors 1*a* to 1*n* and a slope comparing section 29 for comparing the slope (dx1/dt, dx2/dt, dx3/dt . . . ) of the obtained regression line with a preliminarily set reference slope ($dx1^s/dt$, $dx2^s/dt$, $dx3^s/dt$ $dxi^2/dt(i=1, 2, \ldots n)$.

The slope comparing section 29 generates an output signal directly to the alarming section for giving. an alarm when the shape of any one of the regression lines exceeds the reference value. When any of the slopes is below the reference value, an output signal is generated to a prediction computing section 30 to actuate the same. For computation of the regression line and the slope thereof, known statistical methods may be employed.

The prediction computing section 30 comprises a slope extracting section 31 and a time prediction computing section 32. The slope extracting section 31 extracts the slopes dxi/dt of the regression lines from the regression line computing section 28 and supplies the same to the time prediction computing section 32.

In the time prediction computing section 32, an equation which is obtained by modifying the closed danger level surface $f(x)_D=0$ with respect to time is preliminarily set and the time prediction computing section 32 computes the time which is needed for the vector x (t0) at the preset time t0 to reach the danger level. The case in which three analog sensors 1*a*,1*b*,1*c* are employed and the closed surface $f(x)_D=0$ representing the danger level is assumed as a spherical surface will now be expressed. The running data of the analog sensors 1*a*,1*b*,1*c* at the present time $t_0$ are assumed as $LD1^m$,$LD2^m$,$LD3^m$ and the time to reach the danger level is assumed as tr. The output level $x1^{m+R}$,$x2^{m+R}$,$x3^{m+R}$ of each sensor 1*a*,1*b*,1*c* at the time tr is as follows.

$$x1^{m+R}=LD1^m+tr(dx1/dt)$$

$$x2^{m+R}=LD2^m+tr(dx2/dt)$$

$$x3^{m+R}=LD3^m+tr(dx3/dt)$$

The above dx1/dt,dx2/dt,dx3/dt are the slopes computed by the regression lines of the running average data from sensors 1*a*,1*b*,1*c*.

The closed surface $f(x)_D$ is expressed as folows since the surface is assumed as spherical:

$$f(x)_D=(x1^{m+R})^2+(x2^{m+R})^2+(x3^{m+R})^2-r^2=0$$

where r in the radius of the spherical surface.

The time tr can be easily obtained by computing the following quadratic equation.

$$f(x)_D = \{LD1^m + tr(dx1/dt)\}^2 + \{LD2^m + tr(dx2/dt)\}^2 + \{LD3^m + tr(dx3/dt)\}^2 - r^2 = tr^2\,\{(dx1/dt)^2 + (dx2/dt)^2 + (dx3/dt)^2\} + 2tr\,\{LD1^m(dx1/dt) + LD2^m(dx2/dt) + LD3^m(dx3/dt)\} + \{(LD1^m)^2 + (LD2^m)^2 + (LD3^m)^2\} - r^2 = 0$$

-continued

It is computed that the terminal point of the vector x penetrates the closed surface of the danger level after the time tr.

A danger time td is preliminarily set in the damger time determining section 33, and when the time tr is equal to or less than the danger time td, an output signal is generated to the alarming section unit 7.

Figure 8:
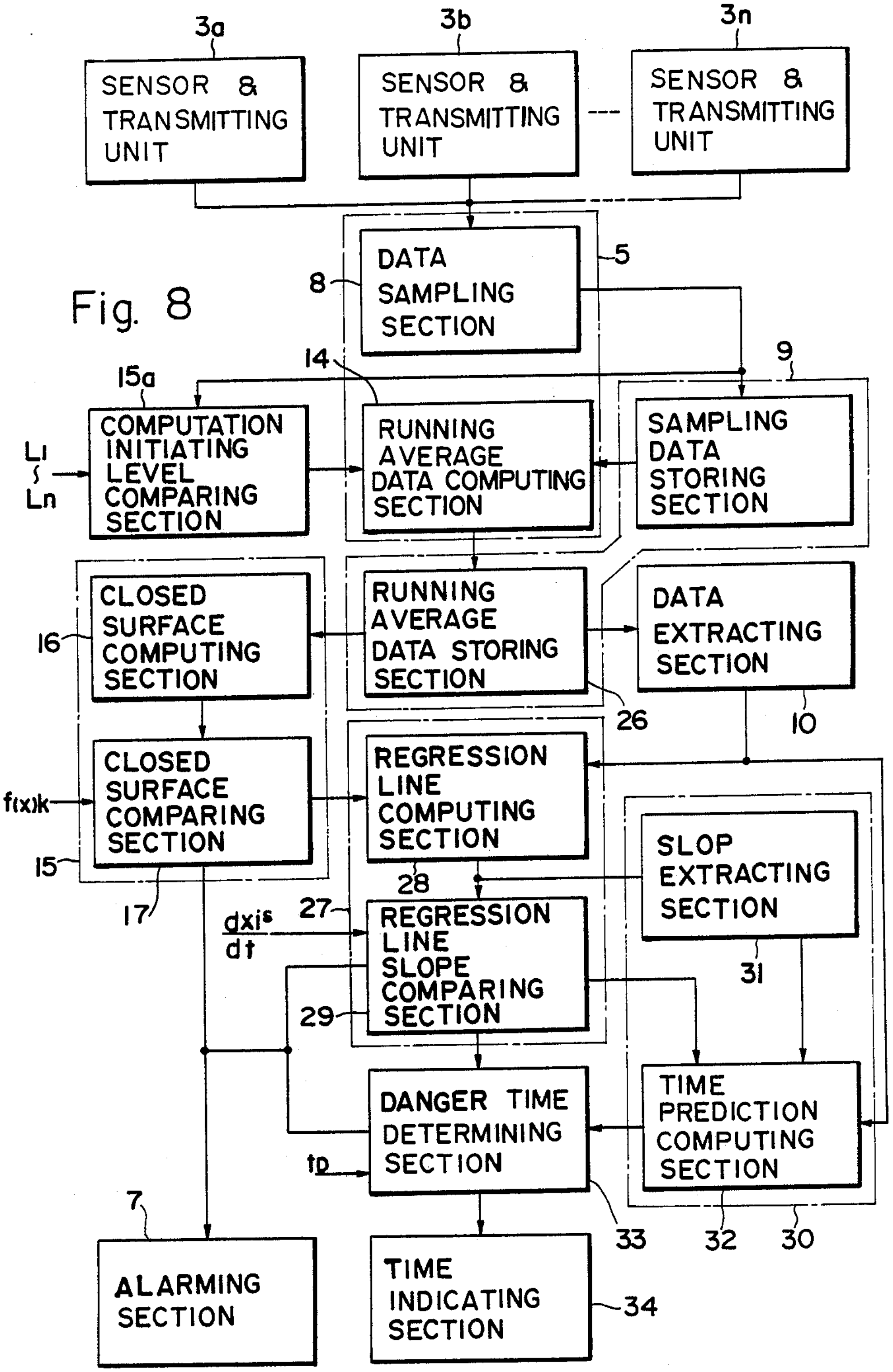
FIG. 8 is a block diagram of a second embodiment of the present invention.

The time prediction computing section 32 of the second embodiment, in FIG. 8, may be replaced by the closed surface prediction computing section 21 of the first embodiment, in FIG. 3, for effecting the determination based on the level of the data. The regression linear line approximation may alternatively be a regression curved line approximation. In FIG. 8, 34 is a time indicating section for indicating the time tr. For example, tr may be indicated as 5 minutes, 4 minutes, 3 minutes, 2 minutes or 1 minute. In case a prediction is to be based on level as shown in the first embodiment, if the predicted vector x (tr) reaches the closed surface in 5 minutes, it is indicated that the remaining time to reach the danger level is 5 minutes. Subsequently, the predicted vector x (tr) is obtained assuming tr=4 minutes, and if the vector reaches the closed surface it is indicated that the remaining time is 4 minutes. Similarly, 3 minutes, 2 minutes or 1 minute indication can be effected.

Figure 9:
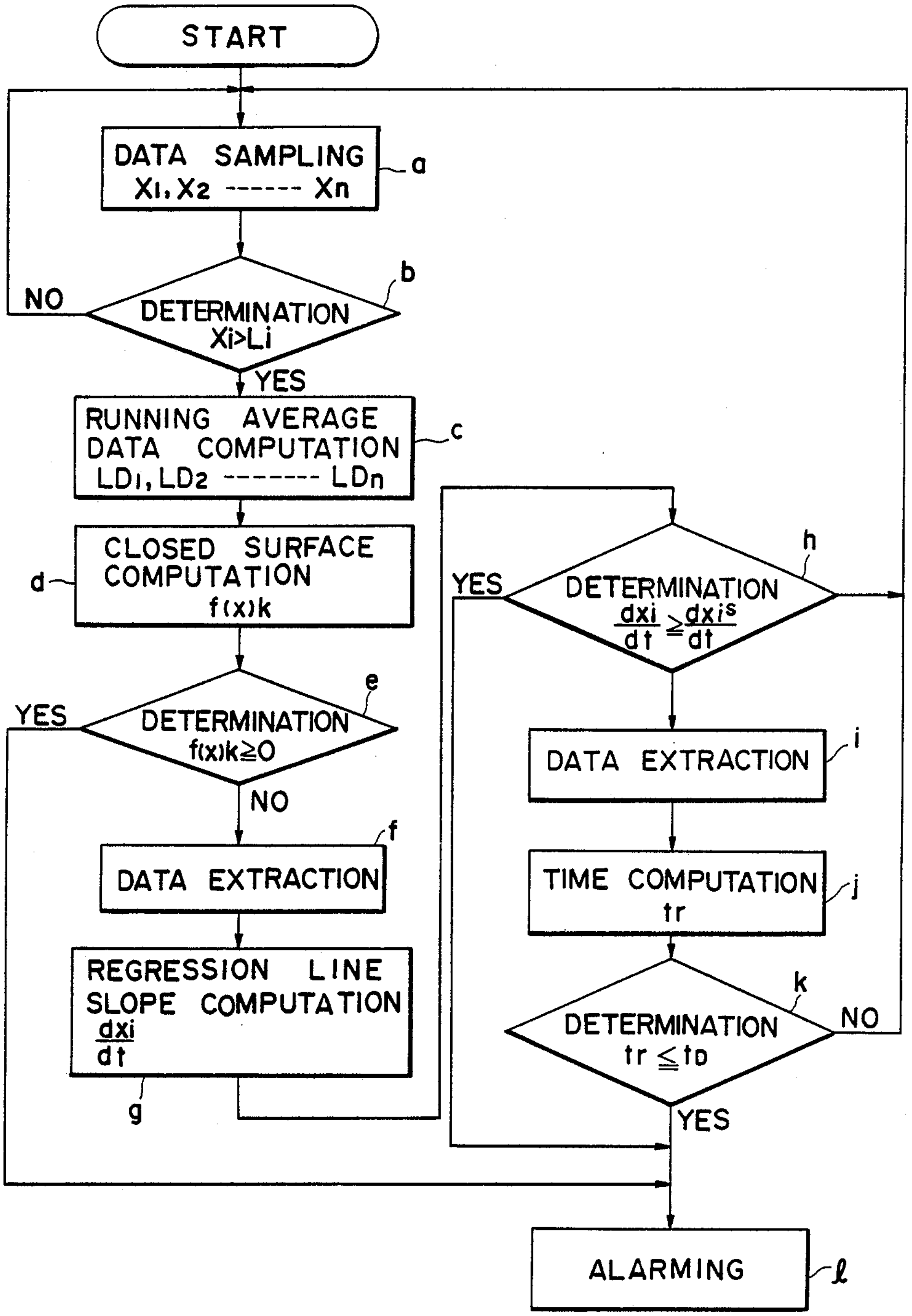
FIG. 9 is a flowchart for a microcomputer employed in the second embodiment of the present invention.

The fire determination processing operation will now be described referring to a flowchart of the microcomputer as shown in FIG. 9. In this flowchart, at block a, the digital data transmitted from the analog sensors 1*a* to 1*n* through the transmitting units 2*a* to 2*n* are received, discriminating the respective analog sensors 1*a* to 1*n* for effecting data sampling. In block b, the data x1 to xn are compared with the threshold values L1 to Ln determined for the respective analog sensors 1*a* to 1*n* and when x1 to xn is less than L1 to Ln the step is returned to block a. When any one of x1 to xn is equal or larger than L1 to Ln, the step proceeds to block c to initiate the predicting computation.

At block c, the running average of the data LD1 to LDn are computed for the respective data x1 to xn. At block d, the latest running average data $LD1^m$ to $LDn^m$ forming the vector x representing the conditions of the surroundings at the present time is substituted for in the closed surface equation $f(x)_k$ which represents the fire level to compute the following:

$$f(LD1^m, LD2^m \ldots LDn^m)_k$$

At block e, it is determined whether $f(x)_k \geqq 0$ and when $f(x)_k \geqq 0$, fire determination is made and the step proceeds to block 1 to give an alarm indicating the fire occurrence through the controlling unit 7. When $f(x)_k < 0$, the step proceeds to block f.

At block f, all or several of the latest one of the running average data $LD1^m$ to $LDn^m$ of the respective analog sensors 1*a* to 1*n* stored in the storing section are extracted. At block g, the regression linear line of each of the sensors 1*a* to 1*n* is obtained from the extricated running average data $LD1^m$ to $LDn^m$ and the slopes dx1/dt are computed. At block h, these slopes dxi/dt are compared with the reference slopes $dxi^s/dt$ and when any one of the slopes dxi/dt, exceeds the reference slopes $dxi^s/dt$ the step proceeds to block 1 to give an alarm indicating the fire occurrence through the alarming section 7. When none of the slopes exceed the reference slopes, the step proceeds to block i.

At block i, the latest running average data $LDi^m$ and the slopes dxi/dt are extracted. At block j, the time tr to reach the danger level is computed from these data. At block k, the time tr is compared with the preliminarily determined danger time tD and if tr≦tD, it is determined that the environmental conditions are dangerous and the step proceeds to again block 1 to give an alarm. When tr<tD, the step is returned to block a to carry out the processing.

The first embodiment in FIG. 9, employs a difference value method of fire determination and the second embodiment employ a functional apploximation method. However it can be easily understood that the functional approximation method can be employed for the first embodiment and the difference value method can be employed for the second embodiment. Also, if the detecting section and the computing section are united in a one-chip computer. a transmitting unit will not be required.

We claim:

1. A fire alarm system which comprises:

n (two or more) detecting sections for detecting changes in n different physical phenomena in the surroundings, said changes being due to the occurrence of a fire, said detecting sections respectively, outputting analog data corresponding to the changes;

a data sampling section for sampling the data from each of said detecting sections at predetermined periods;

a storing section for storing said sampled data outputs from said data sampling section corresponding respectively to the n-detecting sections;

a first computing section for extracting said sampled data from said storing section and computing rates of change of such data;

a second computing section for computing vectors representing the present and future conditions of said n different physical phenomena in combination from the rates of changes of the sampled data computed by said first computing section and said data stored in said storing section;

a comparing section for comparing the vectors computed by said second computing section with predetermined data corresponding to hazardous fire conditions, and generating an output when the relation therebetween is not within a predetermined range; and an alarming section for giving an alarm in response to the output from said comparing section.

2. A fire alarm system according to claim 1, wherein said second computing section computes the terminal points of the vectors representing the conditions of said physical phenomena after a predetermined time, and said comparing section compares said terminal points of the respective vectors with respective mathematical closed surfaces corresponding to data from said sampling sections for predetermined levels of the n kinds of physical phenomena, respectively, and generates an output when the terminal point of any of such vector extends beyond the corresponding predetermined closed surface.

3. A fire alarm system according to claim 2, which further comprises a level determining section provided between one of said data sampling section and said storing section and said first computing section for outputting a signal for actuating said first computing section when at least one of n kinds of data output from said data sampling section exceeds a predetermined level.

4. A fire alarm system according to claim 2, wherein said first computing section computes the rates of change of the sampled data by one of function approximation of such data and evaluating the difference in such data over successive time intervals.

5. A fire alarm system according to claim 2, which further comprises a level determining section between said storing section and said first computing section for outputting a signal for actuating said first computing section when the terminal point of any of the vectors representing the conditions of said physical phenomena computed based on the output data from said data sampling section exceeds the mathematical closed surface corresponding to a predetermined level of such data.

6. A fire alarm system according to claim 5, wherein said second computing section comprises a vector element computing section for predictively computing, for the vectors corresponding to the respective physical phenomena, the terminal points of such vectors after said predetermined period of time based on the rates of change of the sampled data computed by said first computing section.

7. A fire alarm system according to claim 6, wherein said first computing section comprises a slope computing section for computing vectors having slopes corresponding to the rates of change of the sampled data corresponding to the physical phenomena and a slope comparing section for comparing the slopes of the vectors computed by said slope computing section with predetermined values of such slopes, and generating a output when any of said computed slopes exceeds the predetermined slope thereof, such output actuating said alarming section.

8. A fire alarm system according to claim 1, wherein said second computing section comprises a vector element computing section for predictively computing, for the vector corresponding to the respective physical phenomena, the terminal point of such vectors after said predetermined period of time based on the rates of change of the sampled data computed by said first computing section.

9. A fire alarm system according to claim 8, wherein said first computing section comprises a slope computing section for computing vectors having slopes corresponding to changes in the sampled data corresponding to physical phenomena, a slope comparing section for comparing the slopes of the vectors computed by said slope computing section with predetermined values of such slopes, and generating an output when any of said computed slopes exceeds the predetermined slope thereof such outer actuating said alarming section.

10. A fire alarm system according to claim 1, wherein said second computing section computes the time for the terminal points of each of said computed vectors to extend beyond the closed mathematical surfaces corresponding to predetermined levels of the respective n physical phenomena, and said comprising section compares said time computed by said second computing section with a predetermined danger time and generates an output when such computed time is equal to or less than said danger time.

11. A fire alarm system according to claim 10, which further comprises a level determining section between one of said data sampling section and said first computing section, and said storing section and said first computing section, said level determining section outputting a signal for actuating said first computing section when at least one of the n kinds of sampled data output from said data sampling section exceeds a predetermined level.

12. A fire alarm system according to claim 10, wherein said first computing section computes the rates of change of the sample data by one of function approximation and such data and evaluating the difference in such data over successive time intervals.

13. A fire alarm system according to claim 12, wherein said second computing section comprises a vector element computing section for predictively computing, for the vectors corresponding to the respective physical phenomena, the terminal points of such vectors after said predetermined period of time based on the rates of change of the sampled data computed by said first computing section.

14. A fire alarm system according to claim 13, wherein said first computing section comprises a slope computing section for computing vectors having slopes corresponding to the rates of change of the sampled data corresponding to the physical phenomena and a slope comparing section for comparing the slopes of the vectors computed by said slope computing section with predetermined values of such slopes, and generating a respective mathematical closed surfaces corresponding to data fron said sampling sections for predetermined levels of the n kinds of physical phenomena, respectively, and generates an output when the terminal point of any of such vector extends beyond the corresponding predetermined closed surface.

15. A fire alarm system according to claim 12, wherein said first computing section comprises a regression linear line computing section for determining the slopes of the sampled data corresponding to changes in the physical phenomena by approximating such data with linear regression lines, and a slope comparing section for comparing the slopes of the linear regression lines computed by the regression linear line computing section with predetermined slopes, such slope comparing section generating an output for actuating said alarming sectin when any of said computed slopes exceed the corresponding predetermined slope.

16. A fire alarm system according to claim 15, which further comprises a level determining section between said storing section and said first computing section for outputting a signal for actuating said first computing section when the terminal points of the vectors representing the conditions of said physical phenomena as computed based on the output data from said data sampling section extend beyond the closed mathematical surfaces corresponding to predetermined levels of the respective n physical phenomena.

17. A fire alarm system according to claim 16, which further comprises a data processing section between said data sampling section and said storing section for calculating the moving averages of the plurality of data from said data sampling section.

18. A fire alarm system according to claim 10, which further comprises a level determining section between said storing section and said first computing section for outputting a signal for actuating said first computing section when the terminal points of the vectors representing the conditions of said physical phenomena computed based on the output data from said data sampling section extend beyond the closed mathematical surfaces corresponding to predetermined levels of the respective n physical phenomena.

19. A fire alarm system comprising:

n (two or more) detecting means for respectively detecting changes in n different physical phenomena in the surroundings, said phenomena changes being due to occurrence of a fire, and respectively outputting data corresponding to said changes;

first computing means for computing vectors representing said respective data of said n different physical phenomena in combination, wherein each said vector results from vectorial addition of said respective data in n-dimensional space;

comparison means for comparing said vectors computed by said first computing means with predetermined data corresponding to hazardous fire conditions, said comparison means generating an output indicating hazardous conditions when the relationship between said predetermined data and said vector is not within a predetermined range of acceptable conditions; and alarm means for giving an alarm in response to said output from said comparison means.

20. A fire alarm system as claimed in claim 19 and further comprising second computing means for computing the rates of change of said respective data, said vectors computed by said first computing means from said rates of change of said data representing present and future conditions of said n different physical phenomena in vectorial combination.

* * * * *